United States Patent [19]

Hodgson

[11] Patent Number: 5,181,100
[45] Date of Patent: Jan. 19, 1993

[54] DIGITAL VIDEO PROCESSING SYSTEM WITH MIXING PREFILTER

[75] Inventor: David O. Hodgson, San Mateo, Calif.

[73] Assignee: Sony Corporation of America, Park Ridge, N.J.

[21] Appl. No.: 736,006

[22] Filed: Jul. 25, 1991

[51] Int. Cl.⁵ .............................. H04N 7/12
[52] U.S. Cl. .................... 358/37; 358/135
[58] Field of Search ............ 358/37, 51, 54, 76, 358/80, 214, 141, 135; 364/724.16, 724.11, 724.01

[56] References Cited

U.S. PATENT DOCUMENTS

| | | | |
|---|---|---|---|
| 4,691,293 | 9/1987 | Conboy | 364/724.16 |
| 4,763,186 | 8/1988 | Belmares-Sarabia et al. | 358/22 |
| 4,967,272 | 10/1990 | Kao et al. | 358/136 |

Primary Examiner—Edward L. Coles, Sr.
Assistant Examiner—Kim Yen Vu
Attorney, Agent, or Firm—Limbach & Limbach

[57] ABSTRACT

A method and system for combining digital data signals representing digitized images in a manner avoiding aliasing effects. In a class of preferred embodiments, the inventive system includes two data channels, mutiplication circuitry in at least one of the data channels for multiplying the data signal in that channel by a multiplicative factor signal, and circuitry for combining the output of the data channels. Each data signal to be multiplied is prefiltered in an anti-aliasing filter in order to remove high frequency components that would otherwise result in aliasing error during the multiplication operation. The anti-aliasing filter is preferably an adaptive finite impulse response filter which receives the mutliplicative factor signal, and is transparent during times when the multiplicative factor signal has a constant value.

16 Claims, 11 Drawing Sheets

DIGITAL VIDEO PROCESSING SYSTEM WITH MIXING PREFILTER

FIELD OF THE INVENTION

The invention relates to methods and apparatus for mixing or combining digital video signals. More particularly, the invention relates to digital methods and apparatus for mixing or combining digital video signals in a manner avoiding aliasing effects.

BACKGROUND OF THE INVENTION

Conventional motion picture film comprises frames that are displayed sequentially at a frame rate of 24 frames per second (24 fps), or 30 fps, or some other rate. Required special effects may embodied in the displayed film.

Systems (including "telecine" systems) have been developed for converting motion picture film into video signals. These systems generate a video signal from motion picture film images by scanning the film frames sequentially to generate digitized film images. They then convert the digitized images into a video signal having a standard video frame rate (25 video frames per second for PAL video, 29.97 video frames per second for NTSC video, or 30 video frames per second for SMPTE-240M high definition video). Each video frame consists of two fields.

In film scanning systems, it is sometimes desirable to mix digital data signals representing digitized images. For example, it is sometimes desirable to generate a composite data signal suitable for conversion into a composite video signal for display as a split screen image on a video monitor.

However, until the present invention, no practical technique had been developed for mixing signals of this type with simple digital circuitry.

SUMMARY OF THE INVENTION

The invention is a method and system for combining (mixing) a pair of digital data signals representing digitized images (such as digitized film images), in a manner avoiding aliasing effects. In a class of preferred embodiments, the inventive system includes two data channels, multiplication circuitry in at least one of the data channels for multiplying the data signal in that channel by a multiplicative factor signal, and means for combining the output of the data channels. Each data signal to be multiplied is prefiltered in an anti-aliasing filter in order to remove high frequency components that would otherwise result in aliasing error during the multiplication operation.

In one preferred embodiment, the inventive system implements a mix/wipe function by combining input data signals A and B to generate an output signal $P = B + K(A - B)$, where K is a factor signal whose magnitude is selected in response to externally supplied control signals. In first channel, signal B is subtracted from signal A to generate a difference signal $A - B$. The difference signal is filtered in an adaptive finite impulse response anti-aliasing filter, and is then multiplied by signal K in a multiplication circuit. Then, in an addition circuit, the output of the multiplication circuit is added to signal B (which is supplied to the addition circuit through a second channel) to produce the output signal $P = B + K(A - B)$.

DETAILED DESCRIPTION OF THE PREFERRED EMBODIMENT

Figure 1:
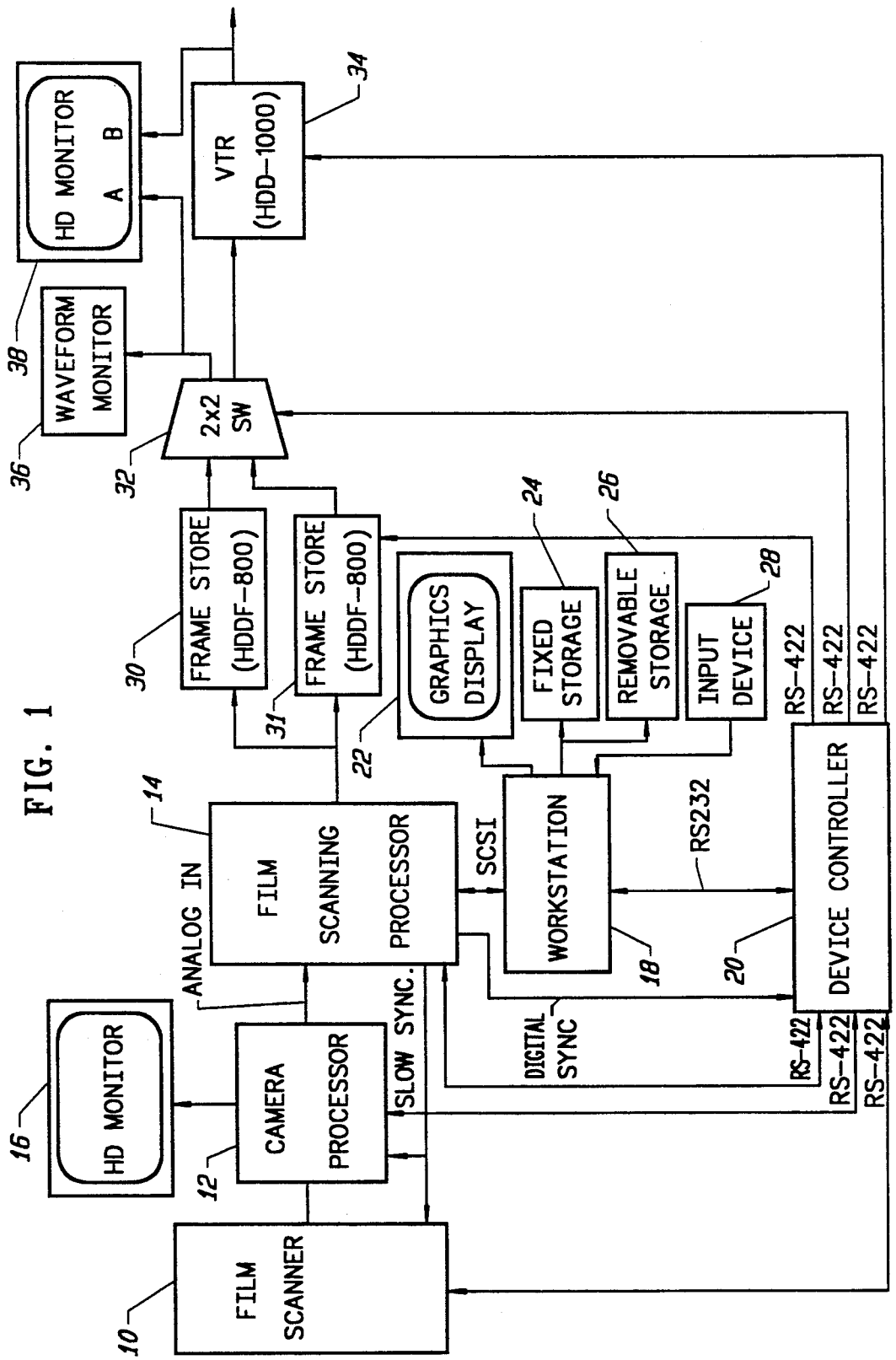
FIG. 1 is a block diagram of a film to video conversion system, in which the invention may be embodied.

The apparatus of the invention can be embodied in the apparatus disclosed in each of the following patent applications, each assigned to the assignee of the present application: "Non-Real-Time Film Scanning System," by P. J. Capitant, D. Hodgson, and V. Perry, filed Aug. 7, 1991 Ser. No. 07/741,329; "Method and Apparatus for Flare Correction," by D. Hodgson and Y. Levy, filed Aug. 19, 1991 Ser. No. 07/746,928; "Digital Color Correction System and Method," by P. Capitant, V. Perry, and K. Swamy, filed Jun. 5, 1991 Ser. No. 07/710,704; "Digital Video Color Processor with Anti-Aliasing Filter," by D. Hodgson, filed Aug. 5, 1991 Ser. No. 07/740,623; "Film-to-Video Frame Image Conversion Apparatus and Method for Selectively Identifying Video Fields and Frames," by P. Capitant, D. Hodgson and V. Perry, filed May 14, 1991, Ser. No. 07/699,928; and "Digitized Film Image Processing System with Bordered Split Screen Display," by P. Capitant, D. Hodgson, and V. Perry, filed Aug. 5, 1991 Ser. No. 07/740,626. The specification of each listed application is incorporated herein by reference.

We contemplate that the invention may be embodied in a film scanning and processing system of the type shown in FIGS. 1-9. The system of FIG. 1 includes film scanner 10 and camera processor 12. Film scanner 10 transports motion picture film (color or black and white) past camera processor 12, which includes a video camera and related analog video signal processing circuitry. Camera processor 12 images each film frame adjacent to it, and generates an analog signal representing each film frame.

In a preferred embodiment, the motion picture film is imaged by camera processor 12 at a rate of 1.875 frames per second ("1.875 fps"), as scanner 10 transports the film past camera processor 12 at that rate (1.875 fps). Camera processor 12 preferably generates analog high definition video signals, such as analog high definition video signals having SMPTE-240M format.

The analog output of camera processor 12 is supplied to film scanning processor 14, and is optionally also displayed on monitor 16. Within film scanning processor 14, the analog video signals from camera processor 12 are digitized, and various digital signal processing operations (to be discussed in detail below with reference to FIGS. 2–6) are performed digitally on the digitized video data. Color correction will typically also be performed by circuitry (to be discussed in detail below with reference to FIG. 6) within processor 14. Flare correction is also performed, preferably digitally, by circuitry within processor 14.

Computer 18 interfaces with, and controls processor 14 and device controller 20. In response to user commands sent from computer input device 28 to computer 18, computer 18 instructs processor 14 to perform signal processing operations selected by the user, and computer 18 instructs controller 20 to send user-selected control signals to processor 12, scanner 10, frame storage units 30 and 31, 2×2 switch 32, and video recording and playback unit 34.

In a preferred embodiment, computer 18 is a workstation (such as a NEWS 1850 workstation, available from Sony Corporation) connected by an SCSI interface to processor 14, computer 18 is connected by an RS232 interface to controller 20, and computer 18 is connected by an RS422 interface to processor 12, scanner 10, frame storage units 30 and 31, switch 32, and video recording and playback unit 34. In one preferred embodiment, units 30 and 31 are Model HDDF-500 high definition video frame store units available from Sony Corporation, and recording and playback unit 34 is a Model HDD-1000 high definition video recorder available from Sony Corporation.

Also connected to computer 18 are fixed data storage means 24 (which may be a hard disk drive) and removable data storage means 26 (which may be a floppy disk drive), and graphics display 22 (preferably, a high resolution color graphics display).

Preferably, computer input device 28 includes a touch tablet for finger selection of menu items and icons displayed on monitor 22, a trackball for selecting color and image areas displayed on monitor 22, and a keyboard for entering text, user notes, and processing parameters.

After the digitized video data are processed digitally in processor 14, the processed data are stored on a frame-by-frame basis in frame stores 30 and 31. Switch 32, under control of controller 20, connects desired ones of frame stores 30 and 31 to video recording and playback unit 34 and to waveform monitor 36 and video monitor 38 (which is preferably a high definition video monitor). To maximize the system's throughput rate, as a frame of data is read out (or multiple frames of data are read out) from one of frame stores 30 and 31, the next frame (or set of frames) of data should simultaneously be written into the other one of frame stores 30 and 31. In such an operating mode, switch 32 connects alternating ones of frame stores 30 and 31 to unit 34 (and optionally also to monitors 36 and 38).

Figure 2:
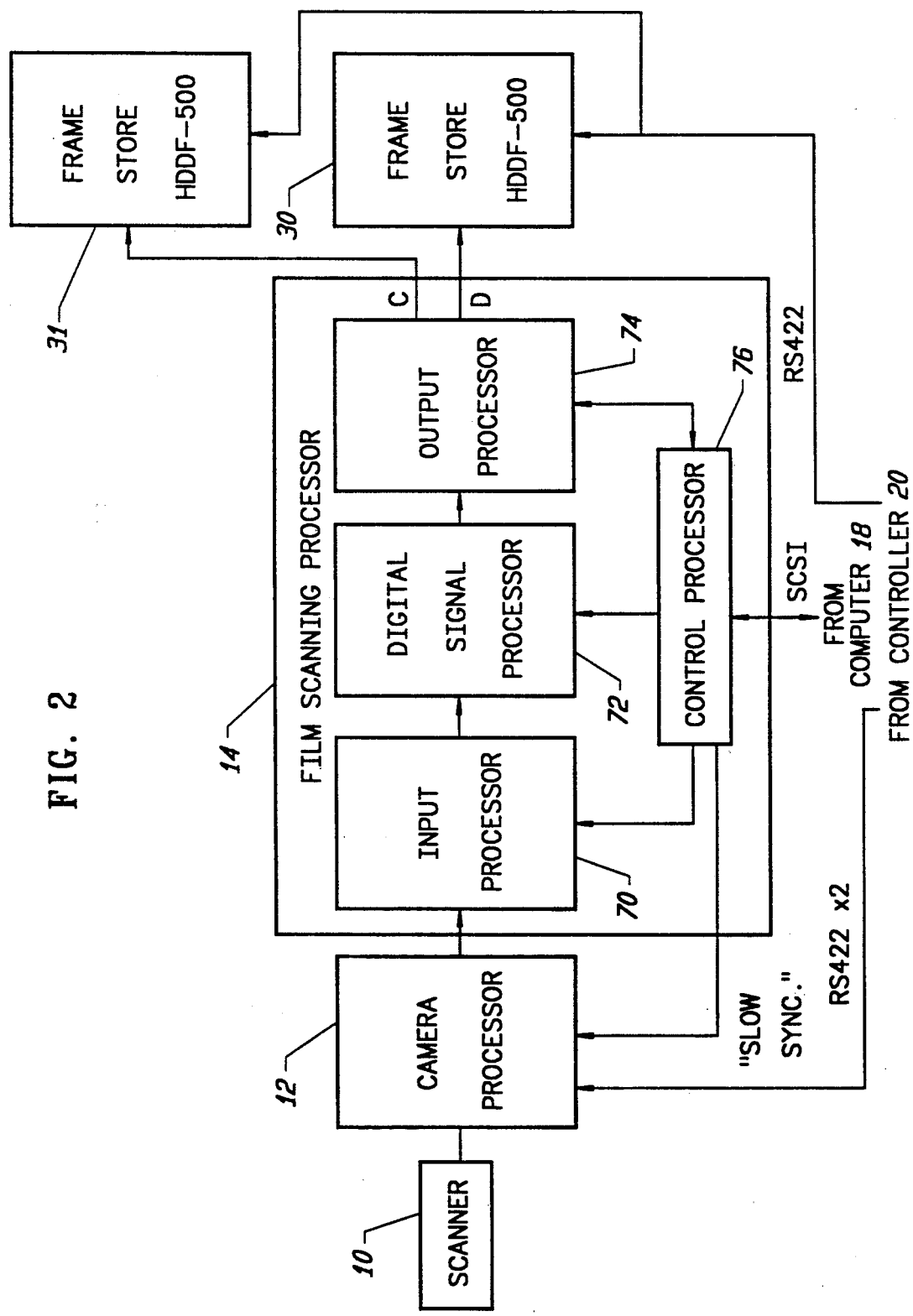
FIG. 2 is a block diagram of a portion of the FIG. 1 system.

The preferred embodiment of film scanning processor 14 shown in FIG. 2 includes input processor 70 (which receives the analog output of camera processor 70), digital signal processor 72, output processor 74, and control processor 76. Input processor 70 digitizes the analog input signal, performs preliminary corrections on the resulting digitized data, and supplies the preliminarily processed digitized data to digital signal processor 72 for color correction. The color corrected data generated in processor 72 are supplied through output processor 74 to frame stores 30 and 31. Processors 70, 72, and 74 operate under control of control processor 76, which in turn receives instructions from computer 18 over an SCSI interface.

In one class of embodiments, control processor 76 generates a synchronization signal for reading out (discharging) an image sensor means within camera processor 12. Preferably, the image sensor means is read out at a low rate (such as 1.875 fps) in response to a correspondingly low rate synchronization signal ("slow sync") from processor 76.

Figure 3:
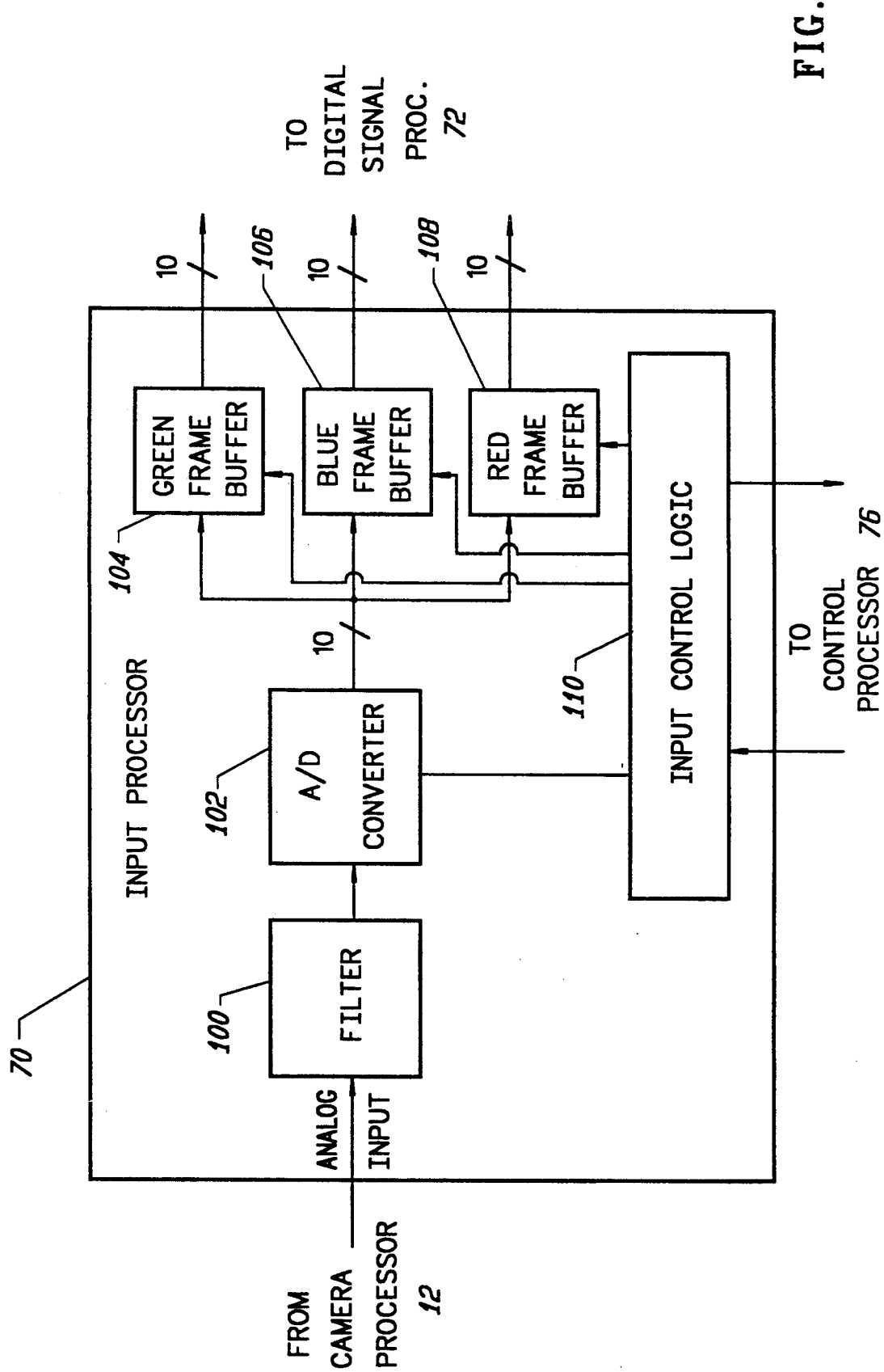
FIG. 3 is a block diagram of the input processor shown in FIG. 2.

A preferred embodiment of input processor 70 is shown in FIG. 3. The analog input signal supplied to processor 70 consists of frames, each comprising 2200×1125 pixels. Each frame consists of 1125 lines, including an even field, an odd field, and 90 lines which comprise the vertical blanking interval (and which contain synchronization information). There are 1920 pixels of active video per line, and the remaining 280 pixels in each line comprise the horizontal blanking interval.

The analog input signal is supplied from camera processor 12 (preferably over a 75 ohm coax cable) to filter/amplifier circuit 100. Circuit 100 includes an amplifier for amplifying the analog input signal, circuitry for separating the sync and video portions of the input signal, and a low pass filter for filtering the video portion of the input signal to enhance resolution during digitization. In one embodiment, the cutoff frequency of the low pass filter within circuit 100 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog output from filter 100 is digitized in analog-to-digital conversion circuit 102. In a preferred embodiment, circuit 102 implements 10-bit quantization, in which case the digital data generated by circuit 102 will comprise ten parallel digital data streams. In order to perform 10-bit quantization with a relatively simple, inexpensive analog-to-digital conversion circuit 102, we prefer that the output frame rate of camera processor 12 should equal 1.875 fps. When the output frame rate of camera processor 12 is 1.875 fps, the digital data emerging from circuit 102 has a data rate of 18.56 MHz (one fourth the proposed real-time SMPTE-240M high definition digital video clock rate, 74.25 MHz).

The digital video data generated by A/D converter 102 are supplied to green frame buffer 104, blue frame buffer 106, and red frame buffer 108. The output of camera processor 12 is time division multiplexed, typically in the following sequence: two fields of blue data, then two fields of green data, then two fields of red data, and finally two fields of gray data. Input control logic circuitry 110 (operating under control of control processor 76) causes frames of blue digital data ("$B_{in}$"), green digital data ("$G_{in}$"), and red digital data ("$R_{in}$") from A-to-D converter 102 to be written sequentially (on a frame-by-frame basis) into buffer 106, then into buffer 104, and next into buffer 108. The gray frames are not normally written into any of buffers 104, 106, and 108.

Blue, green, and red data are written sequentially into buffers 104, 106, and 108 at the source rate (typically, 1.875 frames per second). Blue, green, and red data are read out in parallel from buffers 104, 106, and 108 (to produce three parallel data streams, each representing a different 10-bit color channel) at four times the source rate. Thus, each color channel output from buffers 104, 106, and 108 typically has a frame rate of 7.5 frames per second (one fourth of the proposed standard SMPTE-240M digital video frame rate). In order to achieve the described four-fold increase in frame rate, each bit written into one of buffers 104, 106, and 108, is read out four times from that buffer.

Preferably, each of buffers 104, 106, and 108 is a double buffer, including a first memory, and a second memory into which data can be written while data (previously written into the first memory) is read from the first memory.

As mentioned, the gray frames are not normally written into any of buffers 104, 106, and 108. However, in one class of embodiments, the system has an optional operating mode in which gray frames are read from input processor 70 at four times the source rate at which they are supplied to processor 70. In one such embodiment, a double gray frame buffer is connected in parallel with buffers 104, 106, and 108. One memory within the double gray frame buffer is filled while the other memory therein is read (at four times the source rate) to processor 72. In another of such embodiments, the gray frames (rather than the red, green, and blue frames) are read into one or more of buffers 104, 106, and 108.

In a class of preferred embodiments, the input processor of the inventive system includes means for performing shading correction on the digital output of A-to-D converter 102. In order to perform shading correction, a set of black shading correction signals and white shading correction signals must be generated. In contrast with flare correction signals which compensate for undesired luminance variation due to optical scatter from frame to frame within each color channel, the shading correction signals compensate for undesired luminance variation within each frame due to CCD pattern noise.

The black shading correction signals are preferably generated in the following manner. Camera processor 12 and the input processor (i.e., processor 70' of FIG. 4, or processor 70 of FIG. 2) are operated to generate red, green, and blue digital data collectively representing a "black" motion picture frame. This is conveniently accomplished by positioning a lens cap over the lens of the camera within unit 12, and then operating unit 12 to generate a red frame of data, a green frame of data, and a blue frame of data. The average luminance of each frame is then computed. Then, for each frame, the difference is computed between the luminance of each pixel of the frame, and the frame's average luminance. These difference signals (scaled by a pre-selected constant factor) are employed as red, green, and blue "black" shading correction signals.

White shading correction is performed in a similar manner to black shading correction, except that the white shading correction signals generated during the process are employed as multiplicative factor signals (rather than additive correction signals) to correct the red, green, and blue data streams.

In one class of embodiments, each of frame buffers 104, 106, and 108 includes two memory blocks, each having 1M×12 bit capacity. Each 1M×12 bit block includes three commercially available 1M×4 bit memory circuits. However, in a preferred embodiment within this class, only the ten most significant bits of the data are utilized (in the sense that each pixel read from any of buffers 104, 106, and 108, consists of ten parallel bits).

Figure 4:
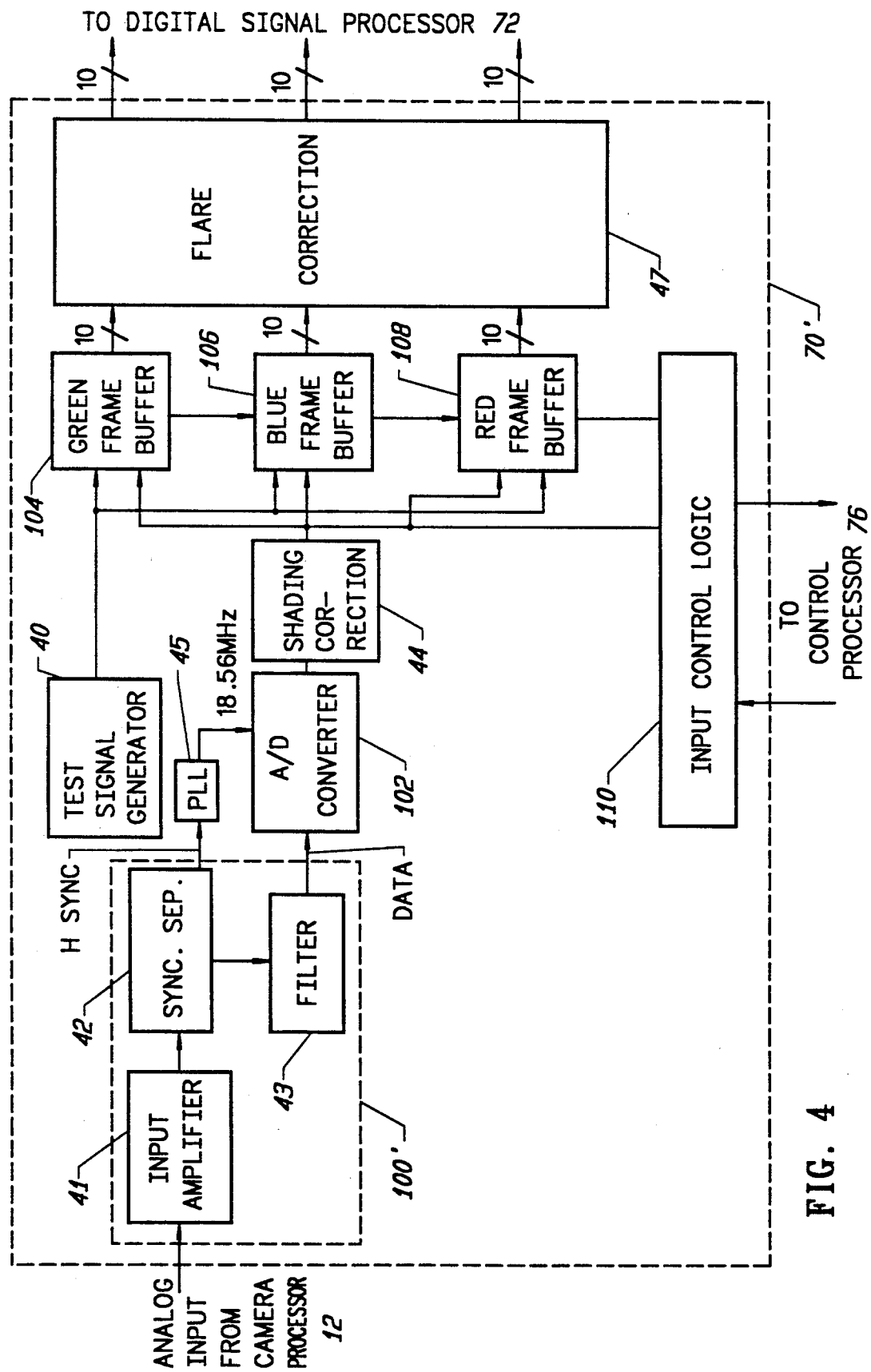
FIG. 4 is a block diagram of an alternative preferred embodiment of the input processor shown in FIG. 2.

Input processor 70' of FIG. 4 is identical to input processor 70 of FIG. 3 except in the following respects. Input processor 70' includes not only includes shading correction circuit 44 for performing black and white shading correction, but also circuit 47 for performing flare correction and lift variation correction.

The analog input signal is supplied from camera processor 12 (preferably over a 75 ohm coax cable) to filter/amplifier circuit 100' of input processor 70'. Circuit 100' includes input amplifier 41, sync separation circuit 42 for separating the horizontal sync, vertical sync, and video data portions of the input signal, and low pass filter 43 for filtering the video data portion of the input signal to reduce aliasing. In one embodiment, the cutoff frequency of low pass filter 43 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog data stream output from filter 43 is digitized in analog-to-digital conversion circuit 102. In a preferred embodiment, the H Sync signal from sync separation circuit 42 is multiplied by 2200 in phase-locked loop 45 to generate an 18.56 MHz clock signal, and this 18.56 MHz clock signal is supplied to A-to-D conversion circuit 102, wherein it is employed to sample the input analog data at a data rate of 18.56 MHz.

In one operating mode, the digital video data generated by A-to-D converter 102 are supplied directly to green frame buffer 104, blue frame buffer 106, and red frame buffer 108 at the source rate (typically, 1.875 frames per second). Blue, green, and red data are read out in parallel from buffers 104, 106, and 108 (to produce three parallel data streams, each representing a different 10-bit color channel) at four times the source rate. In order to achieve the described four-fold increase in frame rate, each bit written into one of buffers 104, 106, and 108, is read out four times from that buffer.

In the normal operating mode, the digital data from A-to-D converter 102 are supplied to shading correction circuit 44. The corrected red, green, and blue data streams output from circuit 44 are written sequentially into frame buffers 104, 106, and 108.

In another operating mode of input processor 70', data from test signal generator 40 (rather than from correction circuit 44) are written sequentially into frame buffers 104, 106, and 108.

The red, green, and blue data streams read out from frame buffers 104, 106, and 108 undergo flare correction (and optionally also lift variation correction) in circuit 47. The corrected red, green, and blue data streams asserted at the output of circuit 47 undergo further processing in digital signal processor 72 (shown in FIGS. 2 and 5).

Figure 5:
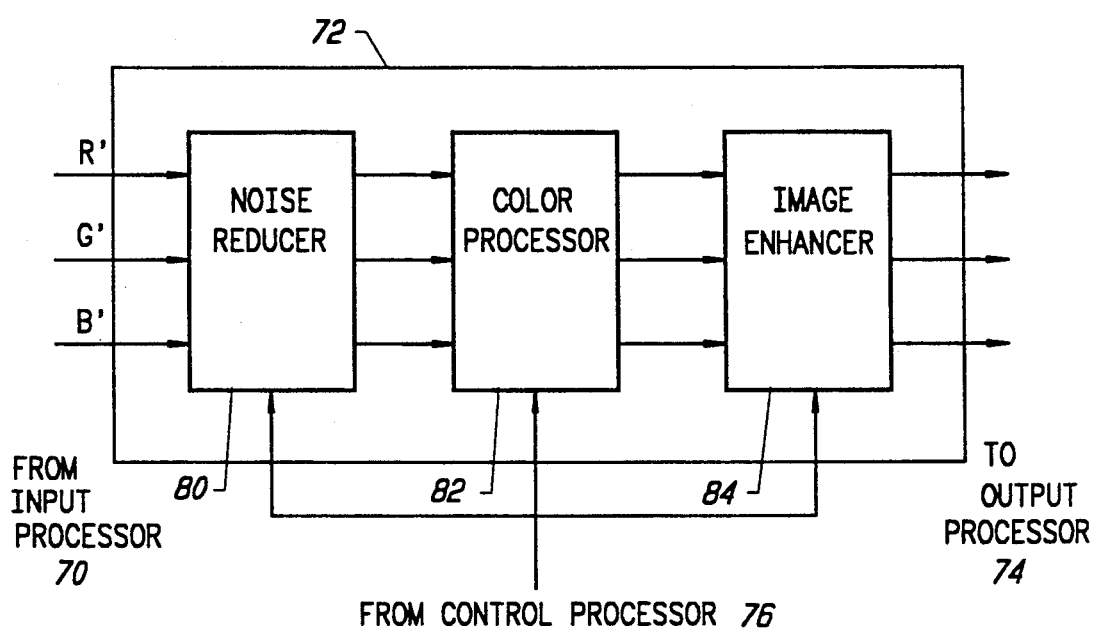
FIG. 5 is block diagram of the digital signal processor shown in FIG. 2.

The preferred embodiment of digital signal processor 72 shown in FIG. 5 preferably includes a noise reduction circuit 80, which receives the data streams supplied, from frame buffers 104, 106, and 108 of input processor 70 (or from circuit 47 of input processor 70'). Noise reduction circuit 80 should include a circuit for reducing film noise (including film grain noise and scratches) and image pick-up system noise (including noise relating to the system's optics and image sensor, as well as associated electronic noise).

As indicated in FIG. 5, the output of noise reduction circuit 80 undergoes digital color correction in color processor 82, and then digital image enhancement in image enhancement circuit 84. Preferably, digital signal processor 72 processes the digital data at an internal processing rate substantially greater than the scanning rate of camera processor 12. For example, if the scanning rate is 1.875 fps, the internal processing rate of processor 72 may desirably be 7.5 fps.

Figure 6:
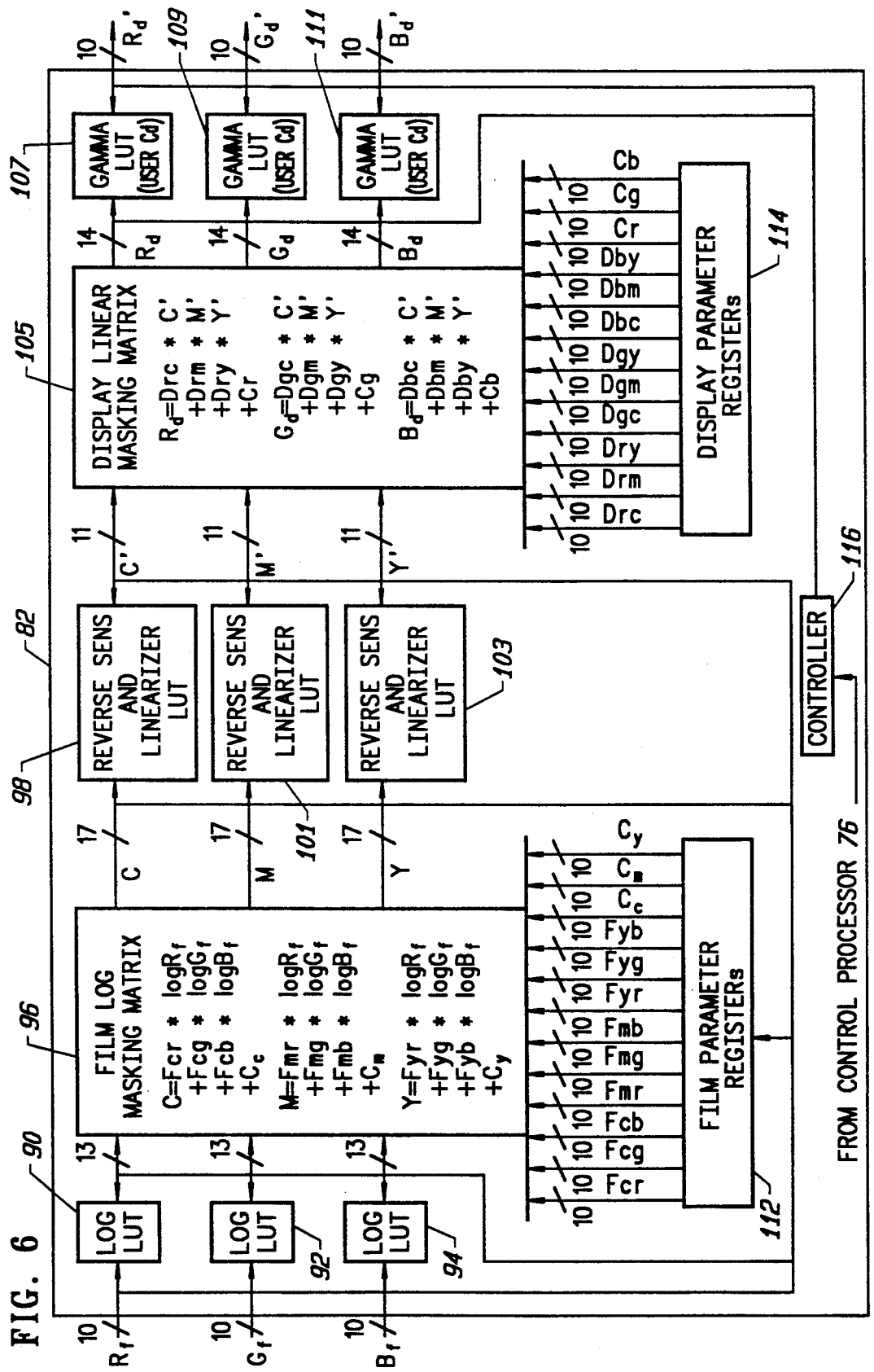
FIG. 6 is block diagram of the color processor shown in FIG. 5.

FIG. 6 is a preferred embodiment of color processor 82. The FIG. 6 apparatus is designed to perform a limited type of color transformation, namely the transformation of the colors of the digitized images generated by camera processor 14 (as a result of scanning motion picture film) into colors that would have been generated if the subject had been imaged directly by a video camera (i.e., without intermediate filming and film scanning steps). If desired, a more complicated and versatile color correction means, for example a "paint" system having the capability to perform a wide range of color transformations, may be substituted for the apparatus of FIG. 6.

The FIG. 6 apparatus includes a film transform section and a display transform section. The film transform section includes logarithm look-up tables 90, 92, and 94, masking matrix 96, parameter registers 112, and "reverse sensitometry and linearizing" look-up tables 98, 101, and 103. Display transform section includes masking matrix 105, parameter registers 114, and gamma function multiplication means 107, 109, and 111.

A logarithm operator is applied to each of the red, green, and blue 10-bit input pixels in look-up tables 90, 92, and 94, to generate a 13-bit value for each 10-bit input pixel. More particularly, logarithm look-up tables 90, 92, and 94 compute the logarithms of the red, green, and blue input pixels, by multiplying them by pre-stored log transformation parameters to generate 13-bit log domain output data.

Masking matrix 96 transforms the log domain data asserted at the outputs of look-up tables 90, 92, and 94 to correct for crosstalk between film dyes, interlayer interimage effects, and the effects of colored coupler masking as seen by camera processor 14. Masking matrix coefficients $F_{cr}$, $F_{cg}$, $F_{cb}$, $F_{mr}$, $F_{mg}$, $F_{mb}$, $F_{yr}$, $F_{yg}$, and $F_{yb}$, and parameters $C_c$, $C_m$, and $C_y$, are determined by the spectral absorption of the film dyes and the spectral sensitivity of camera processor 14's image pickup system, and are stored in registers 112 in response to control signals supplied from controller 116 (in response to control signals from control processor 76). The data pixels asserted at the outputs of masking matrix 96 are proportional to equivalent cyan, magenta, and yellow film densities, and hence are grouped into the channels labeled "C", "M", and "Y".

The equivalent dye densities are related in a well-known manner to selective film exposures by sensitometric and characteristic curves. For this reason, the "cyan" data generated in masking matrix 96 undergoes gamma correction and reverse sensitometry processing, as well as inverse-log transformation in look-up table 98. Similarly, the "magenta" data generated in masking matrix 96 undergoes gamma correction, reverse sensitometry, and inverse-log transformation in look-up table 101, and the "yellow" data generated in masking matrix 96 undergoes gamma correction, reverse sensitometry, and inverse-log transformation in look-up table 103.

Display section linear masking matrix 105 next transforms the linear domain data asserted at the outputs of look-up tables 98, 101, and 103 to compensate for the overall non-ideal spectral characteristics of the system as a whole (including the motion picture film being scanned, camera processor 14, and monitor 38). The masking matrix coefficients $D_{rc}$, $D_{rm}$, $D_{ry}$, $D_{gc}$, $D_{gm}$, $D_{gy}$, $D_{bc}$, $D_{bm}$, and $D_{by}$, and parameters $C_r$, $C_g$, and $C_b$, that are employed to process the CMY data pixels in display linear masking matrix 105 are stored in parameter registers 114.

Masking matrix coefficients $D_{rc}$, $D_{rm}$, $D_{ry}$, $D_{gc}$, $D_{gm}$, $D_{gy}$, $D_{bc}$, $D_{bm}$, $D_{by}$, $F_{cr}$, $F_{cg}$, $F_{cb}$, $F_{mr}$, $F_{mg}$, $F_{mb}$, $F_{yr}$, $F_{yg}$, and $F_{yb}$, and parameters $C_r$, $C_g$, $C_b$, $C_c$, $C_m$, and $C_y$ are preferably selected by the user in the following manner. A test frame, from a sample of motion picture film of the same type as the film to be color-corrected, is scanned. Output processor 74 generates a composite video signal (in a manner to be explained in greater detail below) by combining portions of the test frame and a comparable reference frame. Monitor 38 displays the composite signal as a split screen image (with complementary portions of the test frame and the reference frame in distinct regions of the split screen). To generate the composite signal, control processor 76 reads out the reference frame from one of frame stores 120-127 under the control of computer 18.

While viewing the test frame and the reference frame, the user selects the processing coefficients and parameters interactively (by entering commands to input device 28 in response to menus displayed on computer graphics monitor 22) to achieve a desired visual appearance of the two displayed images.

In a variation on this procedure, the user selects a set of processing coefficients and parameters for each of a number of selected motion picture film frames (preferably using different corresponding pre-stored reference frames for each selected motion picture film frame), and computer 18 downloads each selected set of coefficients and parameters through control processor 76 and controller 116 at appropriate times to registers 112 and 114. Computer 18 also automatically generates coefficients and parameters for intermediate film frames (i.e., film frames for which the user did not specifically select coefficients and parameters) by employing an interpolation technique, and downloads these interpolated coefficients and parameters (at appropriate times) to registers 112 and 114.

After the data pixels asserted at the outputs of look-up tables 98, 101, and 103, are processed in display linear masking matrix 105, they are proportional to red, green, blue HDVS high definition video pixels and hence are grouped into the channels labeled "$R_d$", "$G_d$", and "$B_d$". Each of the $R_d$, $G_d$, and $B_d$ data streams is processed in a corresponding one of gamma function multiplication circuits 107, 109, and 111, to compensate for the nonlinear characteristics of the display monitor. In one class of embodiments, each of multiplication circuits 107, 109, and 111 is implemented as a single look-up table comprising a read-only memory which stores a set of transform parameters to be applied to all input pixels in the relevant RGB channel.

However, an implementation employing a single look-up table for each RGB channel may undesirably introduce aliased data components into the data which cannot practically be subsequently removed.

Accordingly, we prefer to implement each of multiplication circuits 107, 109, and 111 as a set of N parallel look-up tables (each for applying a different term of an N-degree polynomial to the data) with a low-pass filter for pre-filtering the input data supplied to each look-up table. In this preferred embodiment, the data supplied to each look-up table are pre-filtered in the corresponding filter to eliminate high frequency components of the data which would otherwise introduce aliased signal components into the output of the look-up table. Within each color channel, each low-band-pass filter preferably passes a different frequency band, with the cut-off frequencies for the filters corresponding to higher-order polynomial terms exceeding the cut-off frequencies for the filters for lower-order polynomial terms.

The output of color processor 82 preferably undergoes image enhancement in image enhancement circuit 84 (shown in FIG. 5) prior to subsequent processing in output processor 74. Image enhancement means 84 preferably performs both edge enhancement and softening. In alternative versions of digital signal processor 72 shown in FIG. 5, noise reduction means 80 or image enhancement means 84 (or both means 80 and means 84) are omitted.

Figure 7:
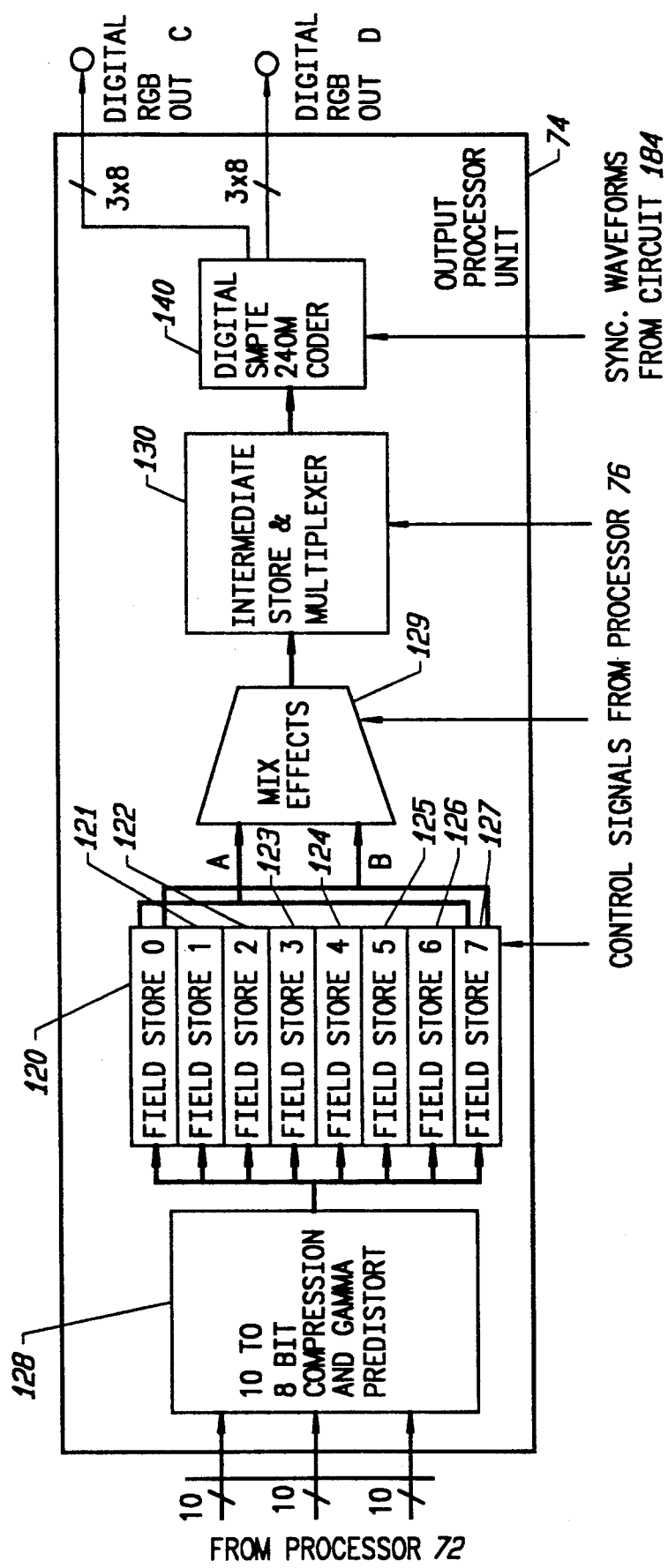
FIG. 7 is block diagram of the output processor shown in FIG. 2.

The preferred embodiment of output processor 74 shown in FIG. 7 includes compression circuit 128, which receives digitized frames of 10-bit parallel data from digital signal processor 72, and compresses the 10-bit parallel data stream into an 8-bit parallel data stream. The 8-bit data stream is written into a selected sequence of assembly field stores 120-127 in response to control signals supplied from control processor 76 to the field stores 120-127 (only one of field stores 120-127 receives data at a time). One or more digitized reference fields (typically, two reference fields which comprising a reference frame) are also stored in selected ones of field stores 120-127.

Five of field stores 120-127 are required to perform the 3-2 pulldown scanning process to be described below. Typically, two of field stores 120-127 are employed to store reference fields which comprise a reference frame.

Compression circuit 128 optionally also includes circuitry for performing display gamma predistortion on the 8-bit parallel data before the data are written into field stores 120-127.

As indicated in FIG. 7, data may be read from any two of field stores 120-127 in parallel, to produce two 8-bit parallel digital data streams A and B (for each color channel). In one typical case, data stream A represents a color-corrected motion picture film frame from digital signal processor 72, and data stream B represents a reference video frame pre-stored in the field stores.

Data are written into (and read out from) field stores 120-127 in response to control signals from processor 76. In one embodiment, a 3-2 pulldown process is implemented to write data from the field stores. Such a 3-2 pulldown process typically contemplates that camera processor 12 scans a motion picture film at a frame rate of (24/N) fps, where N is an integer, as the film advances through scanner 10 at the same rate (24/N fps). In one embodiment, N=16, so that camera processor 12 generates video frames at a rate of 1.5 frames per second. In this embodiment, digital data are read from input processor frame stores 104, 106, and 108 at the rate of 6 frames per second (12 fields per second), and written into field stores 120-127 at the same rate (12 fields per second).

Circuit 128 includes means for demultiplexing each frame of data it receives into its constituent odd $f_O$ and even $f_E$ fields, so that individual even or odd fields can be selectively written into fields stores 120-127. In general, to implement the 3-2 pulldown process, individual fields are written sequentially into field stores 120-127, and different sequences of fields (including some duplicate odd $f_{OD}$ and even $f_{ED}$ fields) are read from the field stores (at a higher field rate) to produce frames of output video data. Each frame of output video data includes one odd $f_O$ and one even $f_E$ field. In one embodiment, fields are written into field stores 120-127 at the rate of 12 fields per second, and are read out from fields stores 120-127 at the rate of 15 fields per second.

For example, in response to control signals from processor 76, fields can be written from circuit 128 into selected ones of field stores 120-127 in the following sequence: during a first timing cycle, fields $F_1 f_O$ and $F_1 f_E$ of the first input frame $F_1$, are written into field stores 120 and 121, respectively. During the next timing cycle, the two fields comprising the second input frame $F_2$ are written into field stores 122 and 123, respectively. Similarly, during subsequent timing cycles, subsequent input frames $F_N$ are written into selected pairs of field stores 120-124, or reference fields are written into field stores 125-126.

During the first output timing cycle, fields $F_1 f_O$ and $F_1 f_E$ corresponding to the first input frame $F_1$ are read from field stores 120 and 121. During the second output timing cycle, the odd field from the first input frame is output again as a duplicate field $F_1 f_{OD}$, along with the even field $F_2 f_E$ of the second input frame $F_2$. Subsequent fields are similarly output (for example, in the sequence described in detail in the above-referenced patent application entitled "Film-to-Video Frame Image Conversion Apparatus and Method for Selectively Identifying Video Fields and Frames," by P. Capitant, D. Hodgson and V. Perry, filed May 14, 1991 Ser. No. 07/699,928.

Rate conversion (for example, from the rate of 12 fields per second to the rate of 15 fields per second) is thus achieved by reading out stored fields repeatedly from selected ones of stores 120-127. In one embodiment, data are read from field stores 120-127 at a rate of 60 fields per second (30 fps), and processed in circuit 129, written into circuit 130, and read out from circuit 130 at that rate (30 fps). In another embodiment, data are read from field stores 120-127 at a rate of 15 fields per second (7.5 fps), processed in circuit 129 and written into circuit 130 at the rate of 7.5 fps, but read out from circuit 130 at the rate of 30 fps.

The digital video data stream asserted at the output of circuit 129 includes "artificial" frames comprising even and odd fields from different input frames). Such artificial frames may interfere with subsequent processing of each digital video signal output from processor 74.

Digital data streams A and B from field stores 120-127 are supplied to the two inputs of mixing and effects circuit 129 (to be described in greater detail below with reference to FIG. 10). In response to control signals from processor 76, circuit 129 can implement any of a variety of "fade" and "wipe" transitions between sources A and B, and a variety of static combinations of the data streams A and B. Wipe generator circuitry within circuit 129 is preferably provided for generating rectangular wipes of any size within the output raster. Such wipe generator circuitry preferably can be switched on or off at any time in response to control signals from processor 76.

Circuit 129 preferably includes means for generating a composite video signal from data streams A and B for display as a split screen image in which a portion of the "A" image, and a complementary portion of the "B" image, occupy distinct regions of a monitor screen.

Preferably also, circuitry is provided within circuit 129 for inserting a border signal into the data streams being combined in order to produce a distinctive displayed border which separates the two image regions of the displayed composite signal. Such a distinctive border helps the system user to distinguish a reference image from a test image, since often the test image differs only slightly and subtly from the reference image.

Circuit 129 preferably also includes means for inserting a conventional graphics cursor signal into the composite video digital signal produced by other circuitry within circuit 129. The cursor signal overlays a cursor region of the displayed video output from output processor 74. By operating the input device 28 to change the cursor signal, the user controls the position of the cursor in the displayed video image. In a preferred embodiment, when the displayed cursor highlights a region of a displayed video frame, the user can select color coefficients and parameters to match the highlighted region by entering appropriate commands using the input device 28.

The 8-bit parallel data streams (one 8-bit parallel stream for each of the R,G,B color channels) asserted at the output of circuit 129 is supplied to intermediate frame store circuit 130. The digital data from circuit 129 are written into circuit 130 at a first rate (typically 15 fields per second, which is 7.5 frames per second) and are read out from circuit 130 at four times the first rate (typically, 60 fields per second or 30 frames per second, the proposed standard SMPTE-240M digital video frame rate). Each bit written into circuit 130 is thus read out four times from circuit 130.

Within coding circuit 140, video synchronization signal insertion circuitry inserts conventional digital blanking, sync, and vertical interval data into the horizontal and vertical blanking intervals of the digital data read out from circuit 130. The output of circuit 140 is thus a digital video signal ready for display. Preferably, the inserted sync information is standard high definition digital video sync information (for example, it may satisfy the proposed SMPTE-240M high definition digital video standard), so that the output of circuit 140 is a standard high definition digital color video signal. The sync information is supplied to circuit 140 from an internal timing generator 182 within timing unit 190, which is in turn within control processor 76 (to be described below).

Preferably, coder 140 also inserts encoded "tagging" information into the video signal emerging from circuit 130. The tagging information can be a set of color correction or noise reduction parameters useful for performing subsequent color correction or noise reduction processing, or information which identifies artificial frames generated during the 3-2 pulldown process. Identification of the artificial frames in this manner enables subsequent processing systems (such as an EBR system which converts video signals to motion picture film images) to reject (or specially process) the artificial frames from the output of the FIG. 1 system.

The output of coder 140 is an 8-bit color digital video signal. Coder 140 asserts alternate frames of this digital video signal on output lines C and D, for storage, respectively, in frame stores 30 and 31 (shown in FIG. 1).

Figure 8:
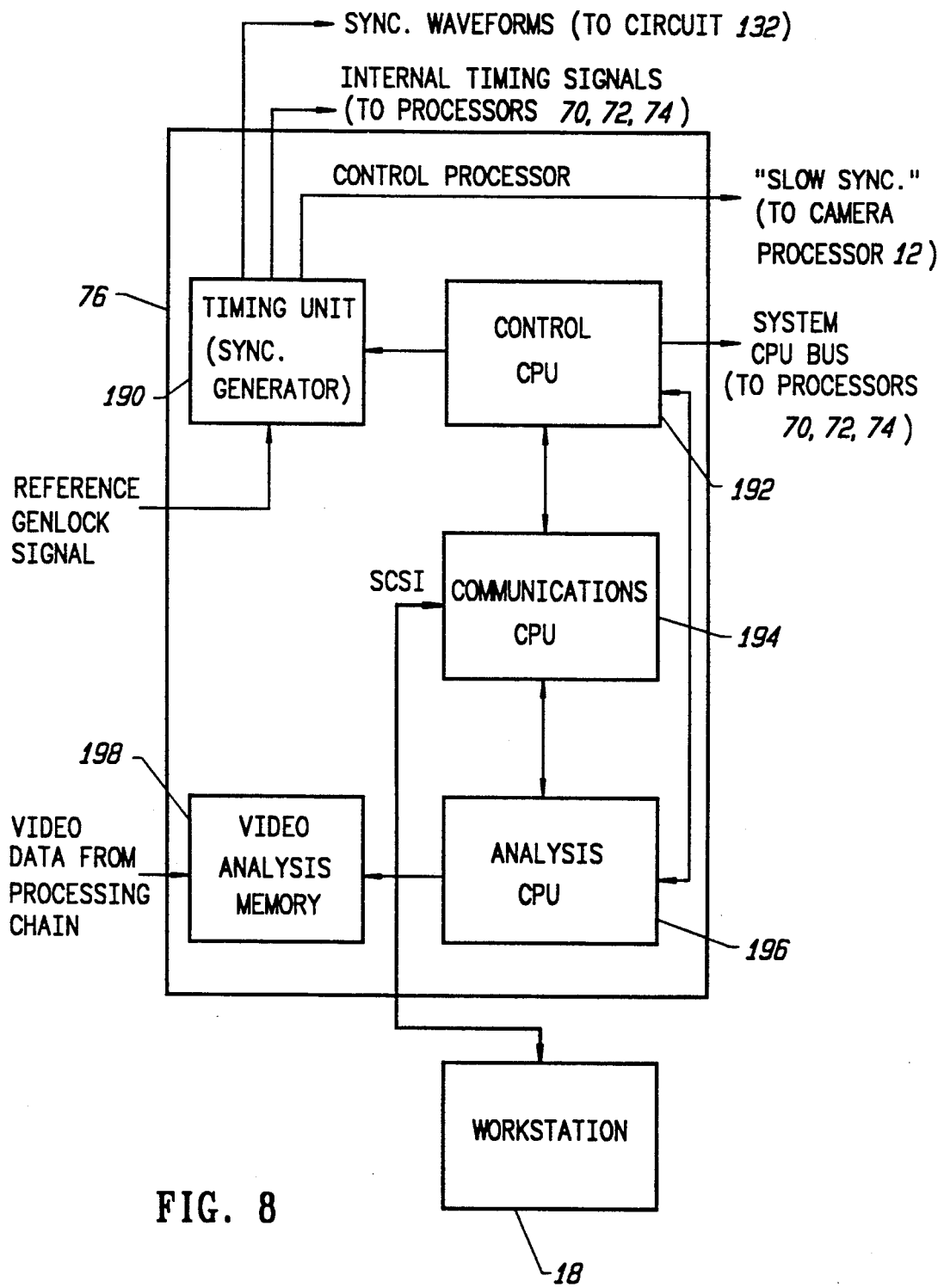
FIG. 8 is block diagram of the control processor shown in FIG. 2.

Control processor 76 of film scanning processor 14 will next be described with reference to FIG. 8. Communications CPU 194 within control processor 76 communicates with computer 18 over an SCSI interface.

The digital data being processed within film scanning processor 14 are supplied to video analysis memory 198. In response to instructions from CPU 194, a data analysis CPU 196 reads data from memory 198, analyzes the data, and sends the analysis results to CPU 194, which relays the results to computer 18.

In response to commands from CPU 194, control CPU 192 sends control signals to timing unit 190, and to the other processing boards within the film scanning processor 14 (input processor 70, digital signal processor 72, and output processor 74).

Figure 9:
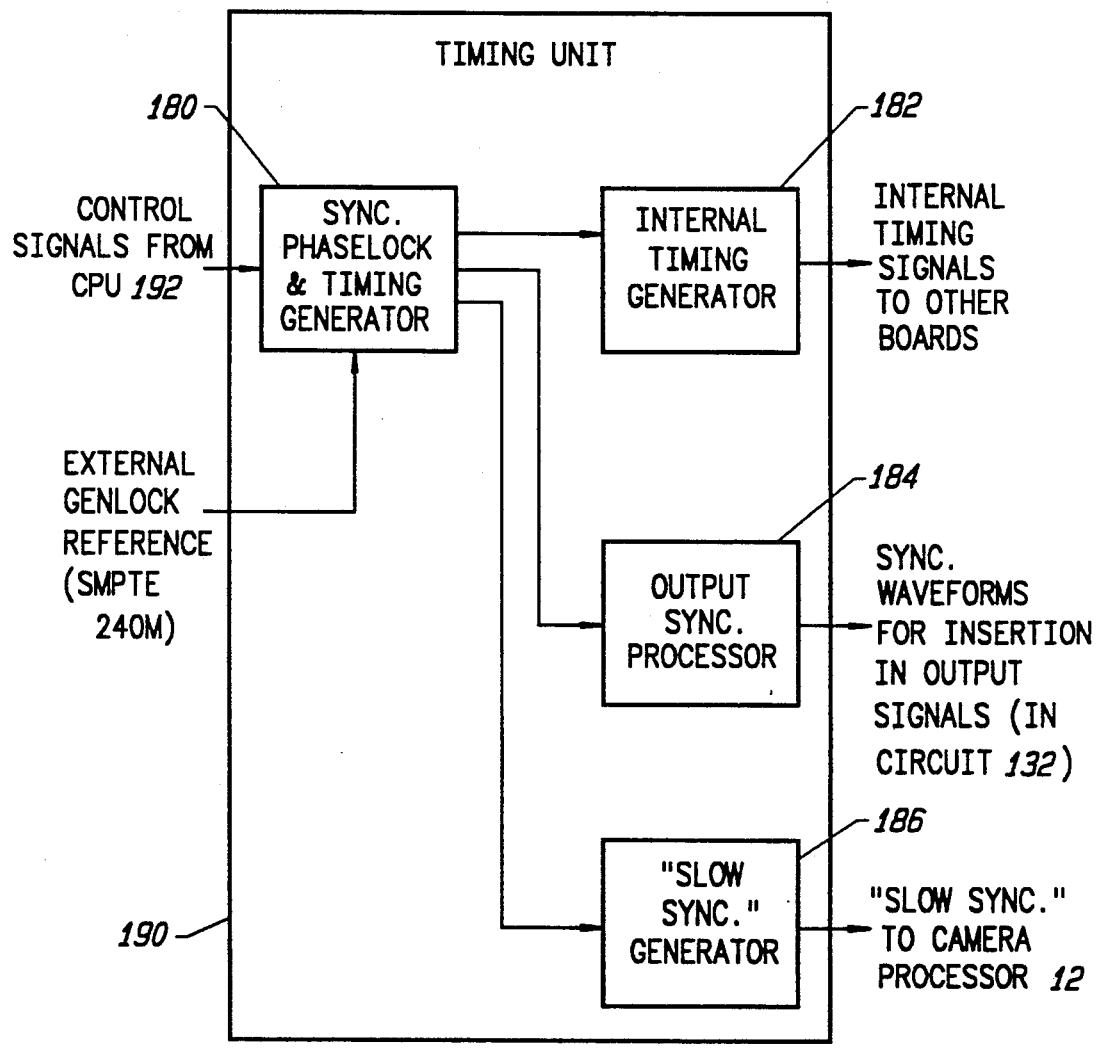
FIG. 9 is block diagram of the timing unit shown in FIG. 8.

With reference to FIG. 9, sync phaselock and timing generator 180 within timing unit 190 receives an external genlock reference signal (preferably an SMPTE-240M genlock reference signal), so that all signals supplied from circuit 180 to the other components of timing unit 190 are phaselocked to the external genlock reference. Slow sync generator 186 generates the above-mentioned low rate synchronization signal ("slow sync") for use by camera processor 12 in response to control signals from CPU 192. Output sync processor 184 generates synchronization waveforms for insertion in circuit 132 into the digital video data stream as described above, in response to control signals from CPU 192. Internal timing generator 182 generates other timing signals for use by processors 70, 72, and 74, in response to control signals from CPU 192.

A preferred embodiment of the inventive system will next be described with reference to FIG. 10. Although the FIG. 10 system is intended to be embodied in circuit 129 shown in FIG. 7, it may alternatively be embodied in other mixing circuits. In FIG. 10, digital data streams A and B from field stores 120-127 are supplied to registers 200 and 202, respectively.

Figure 10:
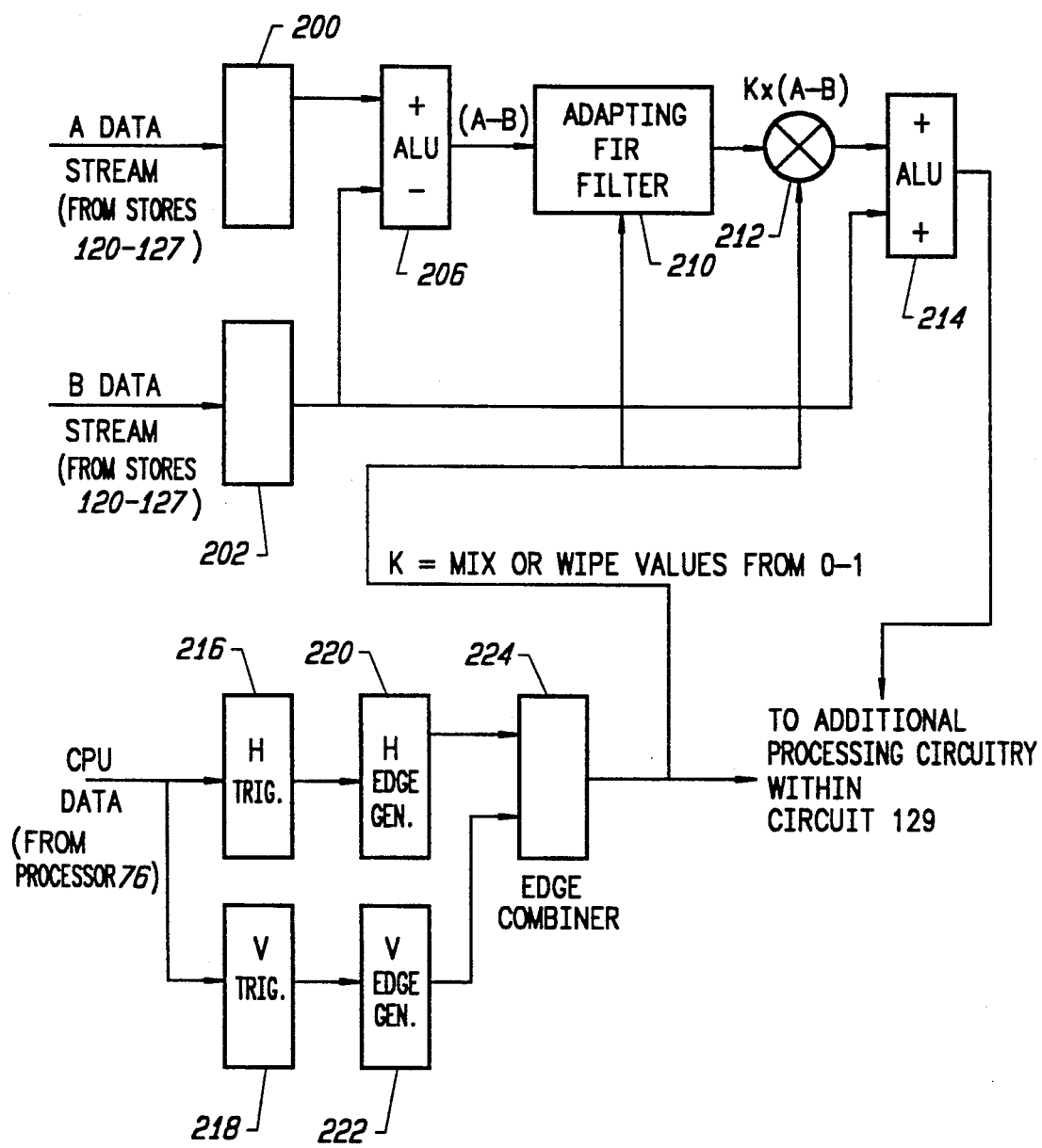
FIG. 10 is a block diagram of a preferred embodiment of the invention, which can be embodied in the output processor of FIG. 7.

The circuitry shown in FIG. 10 implements a mix/wipe function by combining the input data streams A and B to generate an output signal $P = B + K(A - B)$, which is equivalent to the signal $KA + (1 - K)B$. In these expressions, K represents a factor signal whose magnitude is selected in response to control signals from processor 76.

Input signal B is subtracted from input signal A in arithmetic logic circuit 206 to generate the difference signal $A - B$. The difference signal is filtered in adaptive finite impulse response filter 210 (to be explained below), and is multiplied by factor signal K in multiplication circuit 212. The output of circuit 212 is then added to the input signal B from register 202 in arithmetic logic unit 214, to produce the output signal $P = B + K(A - B)$.

The output of multiplication circuit 212 will contain frequency components which were not present in the signals asserted at its inputs (signal K and signal $A - B$). To avoid introduction of aliasing error during multiplication in multiplication circuit 212, the difference signal $(A - B)$ is prefiltered in filter 210 before it is asserted at one of the two inputs of circuit 212. Adaptive filter 210 is transparent when signal K is a static signal (i.e., has a "d.c." or "constant" value). When signal K is dynamic (i.e., time varying, and typically comprising d.c. portions separated by edges) filter 210 low-pass filters the signal $(A - B)$ in the region of each dynamic K edge. The function of filter 210 is to low-pass filter signal $(A - B)$ so that the frequency of the highest frequency component of signal $K(A - B)$ asserted at the output of multiplication circuit 212 is less than half the sampling frequency associated with circuit 212.

The circuit of FIG. 10 is transparent in the case that field signal A and field signal B are identical. In this case, the output of circuit 212 is zero for all values of K. In terms of what would be seen on the video monitor, filter 210 has absolutely no effect on the "combination" of identical signals A and B.

To execute a dynamic wipe between field signals A and B being read from registers 200 and 202, a time varying (dynamic) factor signal K is supplied from edge combiner circuit 224 to filter 210 and multiplication circuit 212. To execute either a static or dynamic combination of signals A and B, the waveform of the dynamic signal K will have at least one edge for each frame (in the sense that at least one edge will occur while each field of data is read from store 200 or 202). To execute a dynamic wipe between signals A and B, the waveform of signal K will also vary from frame to frame (in the sense that its edges will occur at different times during the process of reading out each frame from store 200 or 202).

The dynamic signal K is generated in response to control signals supplied from processor 76 to horizontal triggering circuit 216 and vertical triggering circuit 218. The outputs of circuits 216 and 218 are supplied, respectively, to horizontal edge generation circuit 220 and vertical edge generation circuit 222. The outputs of circuits 220 and 222 are combined in circuit 224 to produce the dynamic signal K.

Any desired wipe transition between fields A and B (whether horizontal, vertical, diagonal, or some other combination of horizontal and vertical) can be implemented using the FIG. 9 circuit. Also using the FIG. 9 circuit, a variety of static combinations of data streams A and B can be implemented (by repeatedly supplying the same signal K to circuit 212 for each consecutive pair of fields A and B supplied to circuit 206), and a variety of fades between data streams A and B can be implemented (by supplying a different d.c. signal K to circuit 212 for each consecutive pair of fields A and B supplied to circuit 206).

The output of circuit 214 can be further processed by additional circuitry within circuit 129, for example by insertion of a cursor signal therein. Alternatively, the output of circuit 214 can be supplied directly to circuit 130 (described above with reference to FIG. 7).

Figure 11:
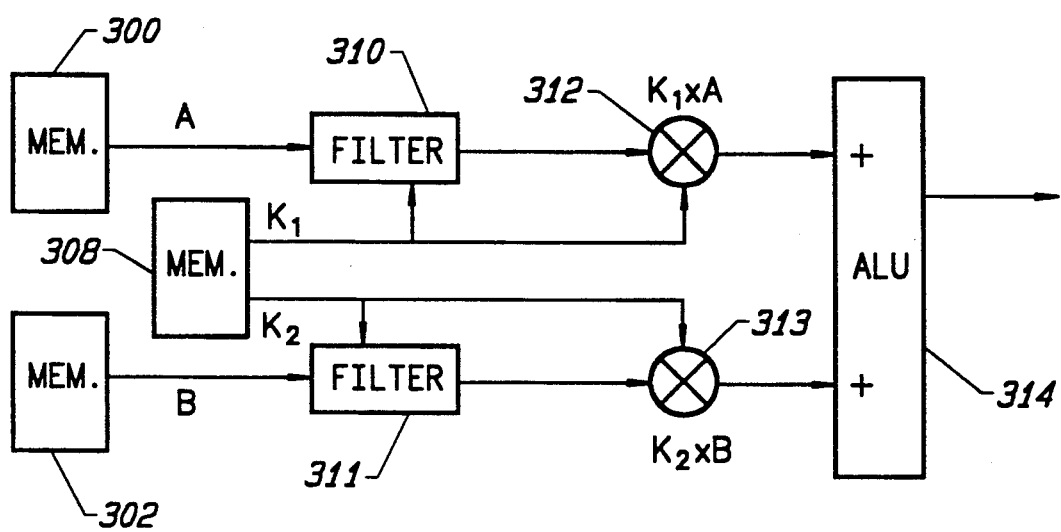
FIG. 11 is a block diagram of an alternative embodiment of the invention.

The circuit of FIG. 11 is a variation on the circuit of FIG. 10. The FIG. 11 circuit includes means 300 for storing digital signal A (representing one or more digitized film images), means 302 for storing digital signal B (representing one or more digitized film images), and means 308 for storing multiplicative factor signals K1 nd K2 (each of the same type as signal K in the FIG. 10 circuit).

Anti-aliasing filter 310 filters signal A as it is read from storage means 300, and anti-aliasing filter 311 filters signal B as it is read from storage means 302. Each of filters 310 and 311 is preferably of the same type as filter 210 of FIG. 10. Filters 310 and 311 are preferably adaptive finite impulse response filters, and for the same reason filter 210 receives factor signal K, filter 310 receives multiplicative factor signal K1, and filter 311 receives multiplicative factor signal K2.

The filtered signals A and B emerging from filters 310 and 311 are supplied to multiplication circuits 312 and 313, respectively. Thus, each of the "A" and "B" signal channels includes an anti-aliasing filter and a multiplication circuit, and the input of each multiplication circuit is prefiltered to exclude frequency components having frequency in excess of half the sampling frequency of the multiplication circuit.

The output (K1×A) of circuit 312 and the output (K2×B) of circuit 313 are supplied to different input terminals of addition circuit 314, which adds these two signals together.

It is also contemplated that variations on the FIG. 10 circuit may include more than two data channels, and a means for combining the output of all the data channels. For example, addition circuit 214 in FIG. 10 could accept three inputs, and a third data stream C could be asserted at the third input of circuit 214 for combination with the data signals asserted at the other two inputs of circuit 214.

Various other modifications and alterations in the method and system of the invention will be apparent to those skilled in the art. Although the invention has been described in connection with specific preferred embodiments, it should be understood that the invention as claimed should not be unduly limited to such specific embodiments.

What is claimed is:

1. A system for combining digital signals, including:
    means for generating an input digital signal representing a digitized image;
    an anti-aliasing filter for generating a filtered input digital signal from the input digital signal;
    means for generating a second digital signal; and
    a multiplication circuit for receiving the filtered input digital signal and the second digital signal, and multiplying the filtered input digital signal and the second digital signal to generate a third digital signal, wherein the anti-aliasing filter generates the filtered input digital signal by removing high frequency components of the input digital signal that would otherwise result in aliasing error during multiplication in the multiplication circuit.

2. The system of claim 1, wherein the second digital signal is a multiplicative factor signal, and wherein the means for generating the second digital signal includes:
    means for generating a static multiplicative factor signal;
    means for generating a dynamic multiplicative factor signal;
    means for supplying a selected one of the static multiplicative factor signal and the dynamic multiplicative factor signal to the multiplication circuit for multiplication with the filtered input digital signal.

3. The system of claim 2, wherein the anti-aliasing filter is an adaptive finite impulse response filter, and wherein the multiplication circuit has a sampling frequency, and also including:
    means for supplying the second digital signal to the adaptive finite impulse response filter, to cause the adaptive finite impulse response filter to be transparent when the static multiplicative factor signal is supplied thereto, and to cause the adaptive finite impulse response filter to remove substantially all frequency components of the input digital signal which would otherwise result in introduction of frequency components into the third digital signal having frequency equal to or greater than half the sampling frequency, when the dynamic multiplicative factor signal is supplied thereto.

4. The system of claim 2, wherein the input digital signal has a magnitude (A−B), where A is the magnitude of a first digital video data signal and B is the magnitude of a second digital video data signal, and also including:

means for implementing a wipe transition between the first digital video data signal and the second digital video data signal, in a mode in which the dynamic multiplicative factor signal is supplied to the multiplication circuit.

5. The system of claim 4, wherein the means for implementing a wipe transition includes:

an arithmetic logic circuit, including a first input terminal for receiving the third digital signal, a second input terminal for receiving the second digital video data signal, and a means for adding the third digital signal and the second digital video data signal.

6. A system for combining digital signals, including:

an arithmetic logic circuit, including a first input terminal and a second input terminal, and means for combining a signal asserted at the first input terminal with a signal asserted at the second input terminal;

a first means for supplying a first digital signal representing digitized images to the first input terminal; and a second means for supplying a second digital signal representing digitized images to the second input terminal, wherein the second means includes:

means for storing an input digital signal representing digitized images;

an anti-aliasing filter for receiving the input digital signal and generating a filtered input digital signal therefrom;

a multiplication circuit having an output terminal connected to the second input terminal of the arithmetic logic circuit, and including means for receiving the filtered input digital signal and generating said second digital signal from the filtered input digital signal, wherein the anti-aliasing filter generates the filtered input digital signal by removing high frequency components thereof that would otherwise result in aliasing error during processing in the multiplication circuit.

7. The system of claim 6, also including:

a means for supplying a multiplicative factor signal to the multiplication circuit; and wherein the multiplication circuit includes a means for multiplying the filtered input digital signal by the multiplicative factor signal to generate said second digital signal.

8. The system of claim 7, wherein the anti-aliasing filter is an adaptive finite impulse response filter, and also including:

means for supplying the multiplicative factor signal to the anti-aliasing filter.

9. The system of claim 8, wherein the multiplication circuit has a sampling frequency, the adaptive finite impulse response filter is transparent when the multiplicative factor signal has a constant value, and when the multiplicative factor signal is time-varying the adaptive finite impulse response filter removes substantially all frequency components of the input digital signal which would otherwise result in introduction of frequency components into the second digital signal having frequency equal to or greater than half the sampling frequency.

10. The system of claim 8, wherein the first digital signal has a magnitude (A−B), where A is the magnitude of a first digital video field signal and B is the magnitude of a second digital video field signal, and also including:

means for implementing a wipe transition between the first digital video field signal and the second digital video field signal.

11. The system of claim 6, wherein the arithmetic logic circuit includes means for adding the first digital signal to the second digital signal.

12. A method for combining digital signals representing digitized images, including the steps of:

(a) filtering a first digital input signal representing digitized images to generate a filtered signal having no significant frequency components with frequency above a first frequency;

(b) multiplying the filtered signal by a factor signal, with a sampling frequency not less than twice the first frequency, to generate a second digital signal; and (c) mixing the second digital signal with a third digital signal representing digitized images, wherein the third digital signal is a video field signal, wherein the first digital signal has a magnitude (A−B), where A is the magnitude of a second video field signal and B is the magnitude of the video field signal, and wherein step (c) includes the step of adding the second digital signal to the third digital signal 13. A method for combining digital signals, including the steps of:

(a) generating an input digital signal representing a digitized image;

(b) generating a second digital signal;

(c) generating a filtered input digital signal from the input digital signal by removing high frequency components of the input digital signal that would otherwise result in aliasing error during the performance of step (d); and (d) multiplying the filtered input digital signal and the second digital signal to generate a third digital signal, wherein the second digital signal is a selected one of a static multiplicative factor signal and a dynamic multiplicative factor signal, and wherein step (d) includes the step of:

supplying the selected one of the static multiplicative factor signal and the dynamic multiplicative factor signal to a multiplication circuit for multiplication with the filtered input digital signal.

14. The method of claim 13, wherein step (c) is performed by processing the input digital signal in an adaptive finite impulse response anti-aliasing filter, wherein the multiplication circuit has a sampling frequency, and wherein step (d) includes the steps of:

supplying the selected one of the static multiplicative factor signal and the dynamic multiplicative factor signal to the filter; and removing substantially all frequency components of the input digital signal which would otherwise result in introduction of frequency components into the third digital signal having frequency equal to or greater than half the sampling frequency, when the dynamic multiplicative factor signal is supplied to the filter.

15. The method of claim 14, wherein the input digital signal has a magnitude (A−B), where A is the magnitude of a first digital video data signal and B is the magnitude of a second digital video data signal, and also including the step of:

executing a wipe transition between the first digital video data signal and the second digital video data signal.

16. The method of claim 15, wherein the step of executing the wipe transition includes the step of:

adding the third digital signal and the second digital video data signal.

* * * * *